(12) United States Patent
Taylor et al.

(10) Patent No.: US 11,277,072 B2
(45) Date of Patent: Mar. 15, 2022

(54) MULTI-PHASE-SHIFT CONTROL OF A POWER CONVERTER

(71) Applicant: HELLA GmbH & Co. KGaA, Lippstadt (DE)

(72) Inventors: Allan Ray Taylor, Grand Blanc, MI (US); Alan Wayne Brown, Canton, MI (US); Philip Michael Johnson, Brighton, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 221 days.

(21) Appl. No.: 16/645,030

(22) PCT Filed: Sep. 28, 2018

(86) PCT No.: PCT/IB2018/057561
§ 371 (c)(1),
(2) Date: Mar. 6, 2020

(87) PCT Pub. No.: WO2019/064259
PCT Pub. Date: Apr. 4, 2019

(65) Prior Publication Data
US 2020/0266714 A1 Aug. 20, 2020

Related U.S. Application Data

(60) Provisional application No. 62/565,429, filed on Sep. 29, 2017.

(51) Int. Cl.
*H02M 3/335* (2006.01)
*B60L 53/22* (2019.01)
(Continued)

(52) U.S. Cl.
CPC ......... *H02M 3/33576* (2013.01); *B60L 50/66* (2019.02); *B60L 53/22* (2019.02);
(Continued)

(58) Field of Classification Search
CPC ............ H02M 3/33576; H02M 7/219; H02M 1/0032; H02M 1/0058; H02M 1/007;
(Continued)

(56) References Cited

U.S. PATENT DOCUMENTS

| 8,817,507 | B2* | 8/2014 | Liu | ........................ | H02M 7/219 320/109 |
| 2010/0097031 | A1* | 4/2010 | King | ........................ | B60L 53/22 320/109 |
| 2014/0368167 | A1* | 12/2014 | Okura | ............... | H02M 3/33576 320/109 |

OTHER PUBLICATIONS

Krismer, Florian, and Johann W. Kolar. "Efficiency-optimized high-current dual active bridge converter for automotive applications." IEEE Transactions on Industrial Electronics 59.7 (2011): 2745-2760.

(Continued)

*Primary Examiner* — Paul Dinh
(74) *Attorney, Agent, or Firm* — Warner Norcross + Judd LLP (57) ABSTRACT

Multi-phase-shift control of a power converter is provided. The power converter includes a dual-active-bridge (DAB) converter having a transformer, a first H-bridge coupled to the primary winding of the transformer, and a second H-bridge coupled to the secondary winding of the transformer. The DAB converter is operable to generate two-level and three-level voltage waveforms on the primary winding and on the secondary winding to yield a system which ensures zero-voltage switching and unity power factor over a wide range of input and output voltage levels and power throughputs. In a multi-phase shift (MPS) mode of operation, the DAB converter changes from a two-level voltage in at least one of the windings to a three-level voltage in both windings in response to the instantaneous load being below (Continued)

a predetermined level, resulting in more efficient performance of the DAB converter in light load conditions.

17 Claims, 9 Drawing Sheets

(51) Int. Cl.
  *B60L 50/60* (2019.01)
  *H02J 7/02* (2016.01)
  *H02M 7/219* (2006.01)
  *H02M 1/00* (2006.01)
(52) U.S. Cl.
  CPC ............... *H02J 7/02* (2013.01); *H02M 7/219* (2013.01); *B60L 2210/10* (2013.01); *B60L 2210/30* (2013.01); *H02J 2207/20* (2020.01); *H02M 1/007* (2021.05); *H02M 1/0032* (2021.05); *H02M 1/0058* (2021.05)

(58) Field of Classification Search
  CPC .... H02M 3/33584; B60L 50/66; B60L 53/22; B60L 2210/10; B60L 2210/30; H02J 7/02; H02J 2207/20; Y02B 70/10; Y02T 10/70; Y02T 10/7072; Y02T 10/92; Y02T 90/14
  USPC ......................................................... 320/109
  See application file for complete search history.

(56) References Cited

OTHER PUBLICATIONS

International Search Report and Written Opinion of International Application PCT/IB2018/057561 dated Nov. 27, 2018.

* cited by examiner

FIG. 9

MULTI-PHASE-SHIFT CONTROL OF A POWER CONVERTER

CROSS-REFERENCE TO RELATED APPLICATION

This application claims the benefit of U.S. Provisional Application 62/565,429, filed Sep. 29, 2017, the disclosure of which is incorporated by reference in its entirety.

FIELD OF THE INVENTION

The present application relates to multi-phase-shift control of a power converter, and more particularly a power converter for an electric vehicle.

BACKGROUND OF THE INVENTION

Conventional electric vehicles utilize a power converter, such as a DC/DC converter, for providing power to one or more vehicle components, including a vehicle battery. Many conventional electric vehicles plug-in into the electric grid for receiving power to charge the vehicle battery. The electrical grid typically provides single-phase or three-phase AC power. The electric vehicle may include charger circuitry that converts the AC power to DC power for charging the vehicle battery. This charger circuitry is typically described in the realm of battery electric vehicles as an on-board battery charger.

Conventional electric vehicle specifications call for high power densities for a variety of reasons, including large battery capacities, possibly 100 kWh, consumer desire for short charging times, and space constraints within the electric vehicle. Several conventional efforts have been made to comply with these requirements but with little success or at the cost of efficiency. These conventional efforts do not provide 1) zero voltage switching (ZVS) for all semiconductor switches within a wide-input-voltage range (e.g., 120-240 VAC) and a wide-output-voltage range (e.g., 200-450 VDC) and 2) high-performance at light load (i.e., they fail to maintain unity power factor at light load). In other words, these conventional efforts experience loss of performance when operated with wide voltage-gains and/or grid current distortion at light load conditions.

For instance, one conventional power converter for an on-board battery charger includes a dual-active-bridge (DAB) circuit that utilizes a single-phase-shift mode of operation. Traditionally, an uncontrolled (diode-based) AC to DC rectifier may be used to convert the AC grid input voltage into a (somewhat) constant DC input voltage for the primary-side DAB input. The DAB may include semiconductor switches that form an active H-bridge for controlling the voltage on the primary and secondary sides of a transformer. The primary-side H-bridge is used in converting a constant DC voltage or a low-frequency time-varying DC voltage into high-frequency AC voltage to drive the transformer and the secondary-side H-bridge is used in rectifying the high-frequency AC power transferred across the transformer back to DC. The single-phase-shift mode of operation may include shifting the phase of both secondary-side H-bridge legs relative to the two primary-side H-bridge legs in an effort to deliver power to the secondary side while achieving zero-voltage switching for all semiconductor switches—but may fail to do so under light loads. Another conventional power converter utilizes the DAB circuity topology but operates it by varying both switching frequency and phase shift. This alternative conventional configuration may ensure ZVS over a wider voltage range, but may still sacrifice the light-load grid current performance or fail to provide unity power factor at the primary-side input. Accordingly, there remains a continued need for an improved power converter adapted to provide ZVS over a wide voltage range with high performance in light load conditions.

SUMMARY OF THE INVENTION

The present invention provides multi-phase-shift control of a power converter for converting a low-frequency time-varying DC input voltage into a constant DC output voltage. The multi-phase-shift control can generate two-level or three-level voltage waveforms on either/both the primary or/and secondary sides of the transformer to yield a system which ensures zero-voltage switching and unity power factor over a wide range of input and output voltage levels and power throughputs, including low and high power outputs.

More specifically, in one embodiment, the power converter operates under a dual-phase-shift (DPS) control or in a triple-phase-shift (TPS) control. The primary and secondary sides are inductively coupled through the transformer. Thus, power can be transferred from the primary to the secondary by proper control of the multi-level voltage signals applied to both the primary and secondary windings of the transformer. The primary-side H-bridge can be controlled to supply power from the input side through generation of either a) a two-level voltage waveform, where the two primary-side H-bridge legs switch 180 degrees out of phase, or b) a three-level voltage waveform, where the two primary-side H-bridge legs switch at a phase shift between 0 and 180 degrees. The secondary-side H-bridge can also be controlled to deliver power to the output side through generation of either a) a two-level voltage waveform, or b) a three-level voltage waveform. When both sides employ a two-level voltage waveform, it is known as single-phase-shift (SPS) control. When the primary-side voltage is three-level and the secondary-side voltage is two-level, it is known as primary-dual-phase-shift (PDPS) control. When the primary-side voltage is two-level and the secondary-side voltage is three-level, it is known as secondary-dual-phase-shift (SDPS) control. Finally, when both the primary-side and secondary-side H-bridge voltages are three-level waveforms, it is known as triple-phase-shift (TPS) control.

The power converter also includes a control system coupled to the primary-side H-bridge and the secondary-side H-bridge. The control system is configured to control the primary-side H-bridge and the secondary-side H-bridge to operate differently during moments of high or low values of instantaneous power transfer. During high instantaneous powers, the control system may direct a) the primary-side H-bridge to generate a two-level voltage waveform or b) the secondary-side H-bridge to generate a two-level voltage waveform, while the other H-bridge still generates a three-level voltage waveform. In the low power mode, the control system may direct both the primary-side H-bridge and the secondary-side H-bridge to generate a three-level voltage waveform.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
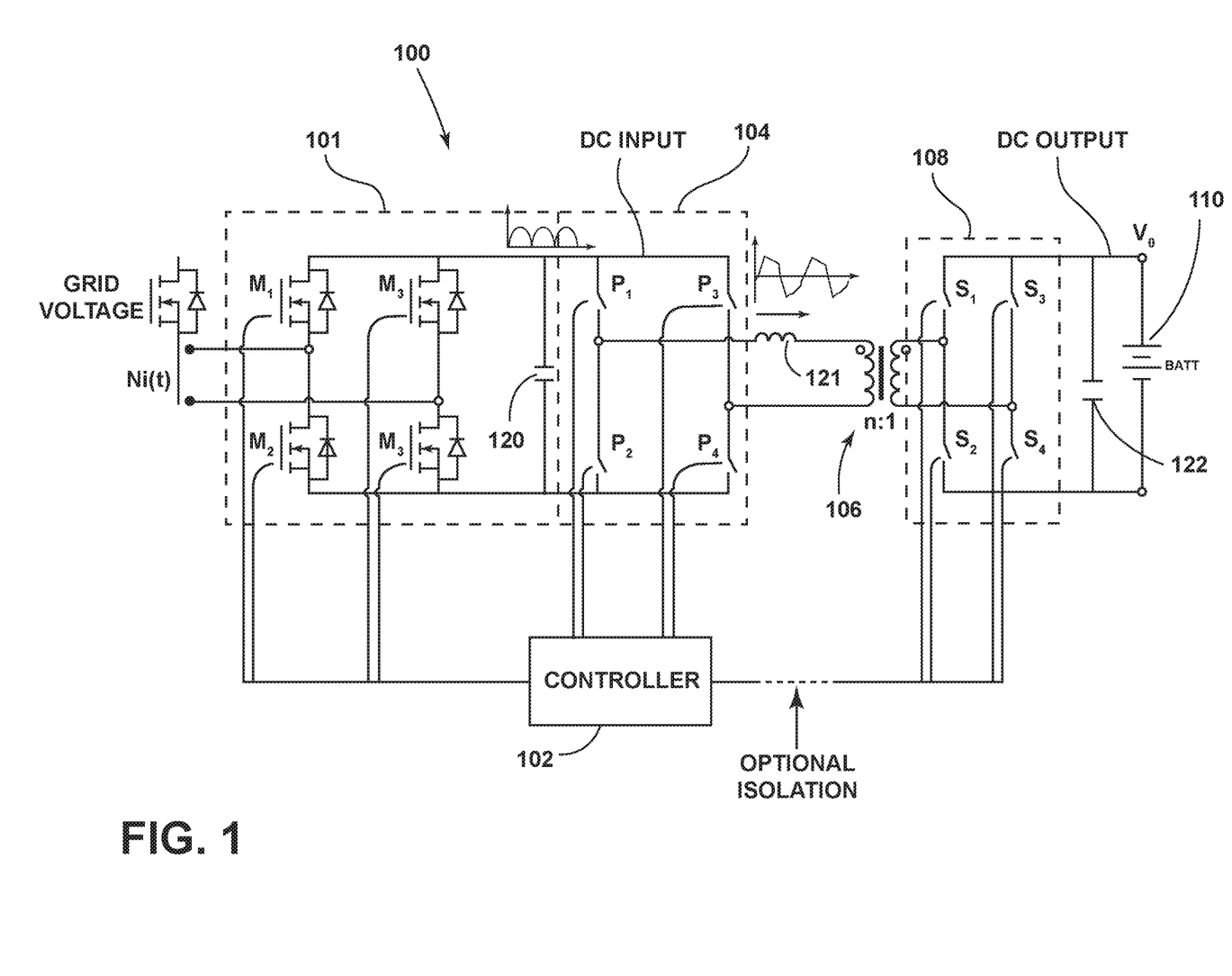
FIG. 1 depicts a power converter according to one embodiment of the present disclosure.

A power converter in accordance with one embodiment of the present disclosure is shown in FIG. 1 and designated 100. The power converter 100 includes a primary-side H-bridge 104 and a secondary-side H-bridge 108 operatively coupled to a transformer 106 formed of a primary winding and a secondary winding. The primary-side H-bridge 104 and the secondary-side H-bridge 108 are operatively coupled to a controller 102 that directs operation of the power converter 100. In one embodiment, the controller 102 controls switching operation of the primary-side H-bridge 104 and the secondary-side H-bridge 108 to convert a DC input provided to the primary-side H-bridge 104 to a DC output generated from the secondary-side H-bridge 108.

In the illustrated embodiment, the controller 102 is isolated from the secondary-side H-bridge 108 such that control over the secondary-side H-bridge 108 is effected through control signals communicated in a galvanically isolated manner (e.g., opto-isolators). It should be understood that, in one embodiment, the controller 102 may be directly coupled to the secondary-side H-bridge 108 to direct switching operation thereof.

The power converter 100 is coupled to a battery 110, directly or indirectly via a charging control circuit (not shown). The battery 110 and the power converter 100 are incorporated into a vehicle in the present embodiment, however, it should be understood that the present disclosure is not limited to the realm of vehicles or battery charging. The power converter 100 can be utilized in a wide variety of applications outside the realm of vehicles, and can be utilized in connection with any type of load, including a load other than the battery 110.

Referring again to FIG. 1, the primary and secondary windings of the transformer 106 provide galvanic isolation, and the winding ratio between the primary and secondary windings of the transformer facilitate stepping up or stepping down the voltage from the primary-side to the secondary-side to provide a DC output or output voltage $V_o$ that is suitable for charging the battery 110. The power converter 100 includes a rectifier stage 101 that is electrically connected to a grid voltage or another type of AC input, and provides the DC input for the primary-side H-bridge 104. The controller 102 in one embodiment directs operation of the rectifier stage 101 to generate the DC input. In the illustrated embodiment, the rectifier stage includes a filter capacitor 120 for conditioning the output from switching circuitry M1, M2, M3, M4 of the rectifier stage 101.

The primary-side H-bridge 104 includes four primary-side switches P1, P2, P3, P4, two of which are high-side switches and two of which are low-side switches. The primary-side switches may be conventional Silicon MOSFETs, or they may be wide-bandgap (WBG) devices, such as Silicon Carbide (SiC) MOSFETs or Gallium Nitride (GaN) HEMTs. Other WPG devices can include silicon nitride devices, boron nitride devices, aluminum nitride devices, and semiconductor devices with diamond material. These primary-side-switches P1-P4 are controlled by the controller 102 to energize the primary of the transformer 106 with power from the DC input in accordance with one or more embodiments herein. In the illustrated embodiment, the primary-side H-bridge 104 is coupled to the primary winding of the transformer 106 via an inductor 121. In another embodiment, the leakage inductance of transformer 106 may also be used to facilitate the magnetic energy storage of inductor 121, in which case, the primary-side H-bridge 104 may be directly connected to the primary winding of the transformer 106.

The secondary-side H-bridge 108 includes four secondary-side switches S1, S2, S3, S4. As discussed herein, the controller 102 directs operation of the secondary-side switches S1-S4 to condition power received in the secondary of the transformer 106 to yield the DC output voltage or $V_o$. In the illustrated embodiment, the secondary-side H-bridge 108 is coupled to a filter capacitor 122 in addition to a load, such as the battery 110.

I. Overview

In one embodiment, the primary-side H-bridge 104, transformer 106, and the secondary-side H-bridge 108 form a dual-active-bridge (DAB) stage. This DAB stage is controllable according to one or more methodologies herein to yield zero voltage switching on all semiconductor switches and unity power factor at low and high power outputs.

Figure 9:
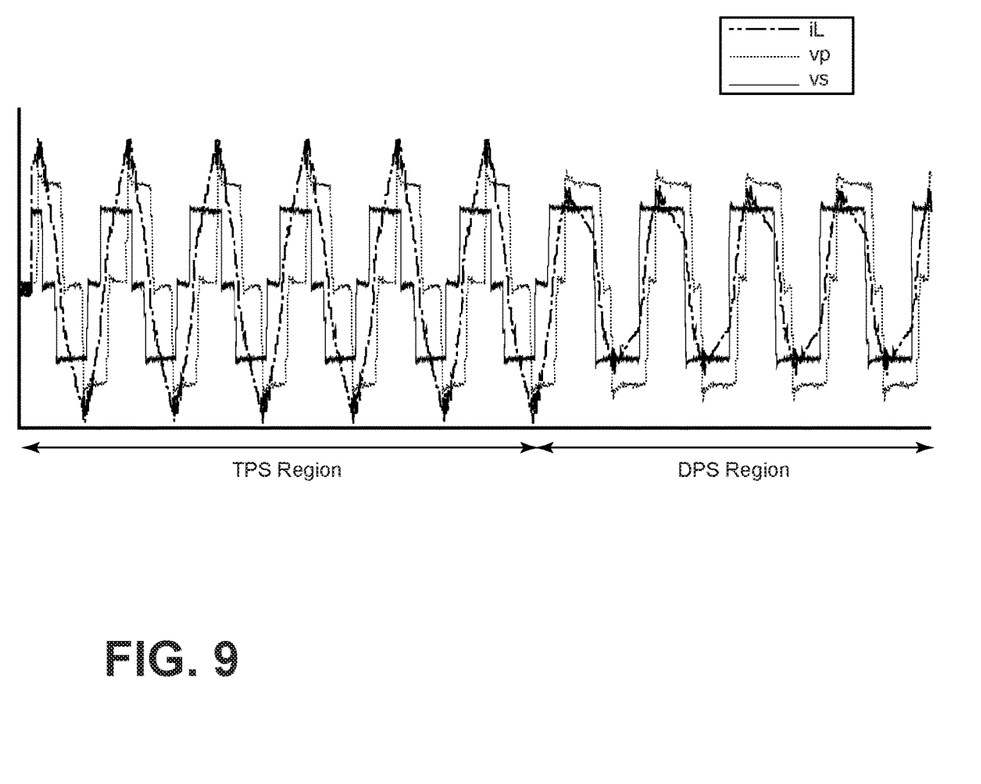
FIG. 9 depicts experimental transformer operating voltage and current waveforms of the power converter of FIG. 1 according to one embodiment during the transition between the triple-phase-shift and dual-phase-shift modes.

More specifically, in one embodiment, the controller 102 operates the DAB stage in a dual-phase-shift mode or a triple-phase-shift mode. In the dual-phase-shift mode, the controller 102 operates the DAB stage so that either the primary-side H-bridge 104 or the secondary-side H-bridge 108 generates a two-level voltage signal in the transformer 106, and the other of the primary-side H-bridge 104 and the secondary-side H-bridge 108 generates a three-level voltage signal in the transformer 106. In multi-phase-shift control, the controller 102 periodically switches between both the dual-phase-shift mode and the triple-phase-shift mode. These variations can be seen in the experimental waveforms of FIG. 9 in which a DAB stage is operated according to one embodiment of the present disclosure in a triple-phase-shift mode and transitions to a dual-phase-shift mode with the stepped voltage signals corresponding to the input voltage to the primary and the output voltage of the secondary. As can be seen, there are distinct levels in the secondary-side voltage, $v_s$, in accordance with the three-level mode and two-level mode of operation.

In one embodiment, the dual-phase-shift mode includes a variable-switching-frequency (VSF) dual-phase-shift (DPS) mode of operation and the triple-phase-shift mode includes a constant-switching-frequency (CSF) mode or a variable-switching-frequency (VSF) mode of operation. Operation according to both the dual-phase-shift mode and the triple-phase-shift mode, depending on one or more sensed characteristics, may yield a multiple-phase-shift (MPS) mode of operation. In another embodiment, with this type of MPS mode of operation, the power converter 100 may 1) realize ZVS turn-on for all switches within a wide-input range (e.g., 120-240 VAC, from 0 V to the peak grid voltage) and a wide-output range (e.g., 200-450 VDC) at the DAB stage, and 2) substantially ensure high-performance at light-load, i.e., maintaining low grid current distortion (unity PF). The VSF-DPS algorithm may secure ZVS, however its PF performance can deteriorate at light-loads. The MPS control algorithm may avoid the light-load grid-current distortion by evolving the VSF-DPS control to a subset of a triple-phase-shift (TPS) control. In this way, unconditional ZVS turn-on and unity power factor at light load is realized.

II. Dual-Phase-Shift Mode of Operation

The dual-phase-shift mode of operation in one embodiment corresponds to a type of control that includes operating the primary-side H-bridge 104 and the secondary-side H-bridge 108 to yield a) a two-level voltage signal on the primary and a three-level voltage signal on the secondary or b) a three-level signal on the primary and a two-level voltage signal on the secondary. These two types of operation may be characterized respectively as secondary-side DPS control (SDPS) or primary-side DPS control (PDPS), each being discussed below.

A. SDPS Control:

$|v_i(t)|<nV_o$

Figure 2:
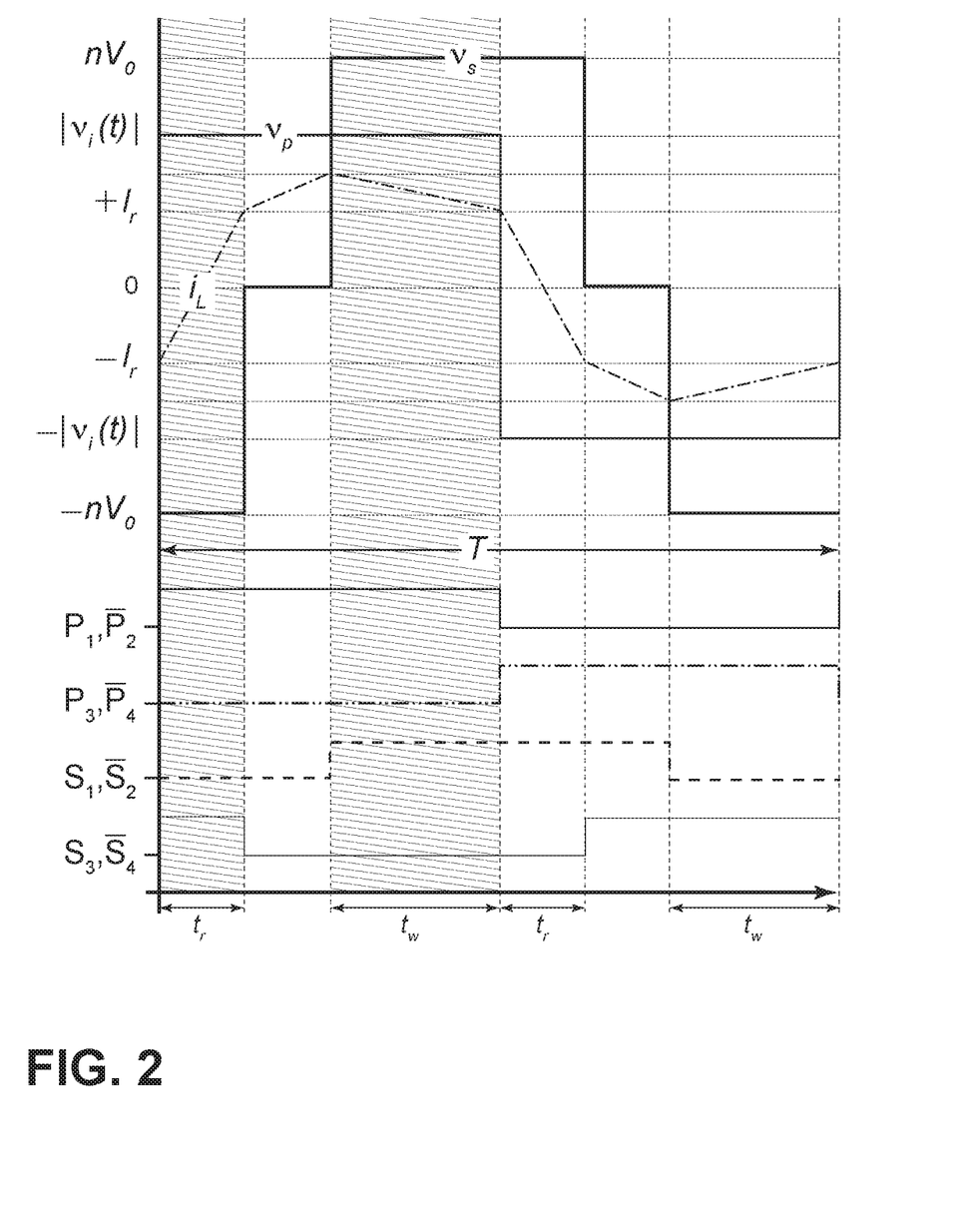
FIG. 2 shows a voltage, current, and switch timing diagram for operating the power converter of FIG. 1 according to one embodiment in a dual-phase-shift mode with a three-level secondary-voltage.

The operative timing of the primary-side switches P1-P4 and the secondary-side switches S1-S4 in accordance with the SPDS mode of control is show in the illustrated embodiment of FIG. 2. In SPDS, $v_i(t)$ is the instantaneous value of the grid voltage, $V_o$ is the battery voltage, and n is the transformer 106 turn-ratio. Switching period T and phase shift times $t_r$ and $t_w$ are shown in FIG. 2. The transformer primary-side voltage, $v_p$, is a two-level square wave, while the secondary-side voltage, $v_s$, is three-level. These two voltages are responsible for shaping the current of the inductor 121 or transformer leakage inductance, $i_L$. To maintain symmetry with near-zero switching-current magnitudes of $I_r$, $t_w$ may be controlled at least in part as function of the grid voltage and the battery voltage. $t_w$ may have a minimum value to maintain a balanced leakage inductor current. While it is possible to reduce $t_w$ to zero (by setting $T=2t_r$), this may involve a very high switching frequency. Thus, if $t_r$ and $t_w$ cannot be zero, there may be a minimum power transfer required for operation. Increasing frequency can reduce the value of $t_w$, but this may be at the expense of increased semiconductor switching losses and transformer magnetic losses. Thus, operation at light-load is considered limited by the maximum switching frequency of the system.

B. PDPS Control:

$|v_i(t)|>nV_o$

Figure 3:
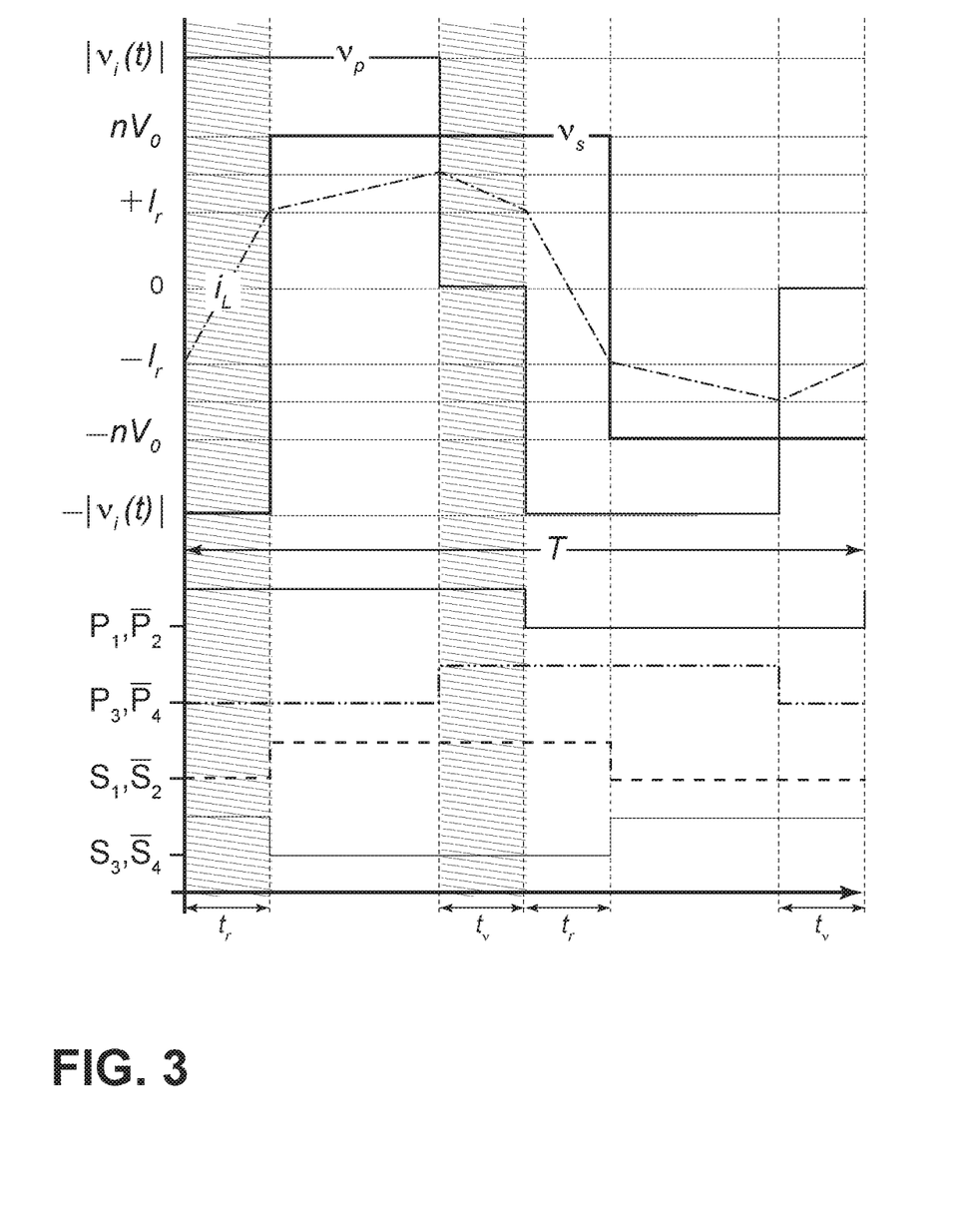
FIG. 3 shows a voltage, current, and switch timing diagram for operating the power converter of FIG. 1 according to one embodiment in a dual-phase-shift mode a three-level primary-voltage.
Figure 4:
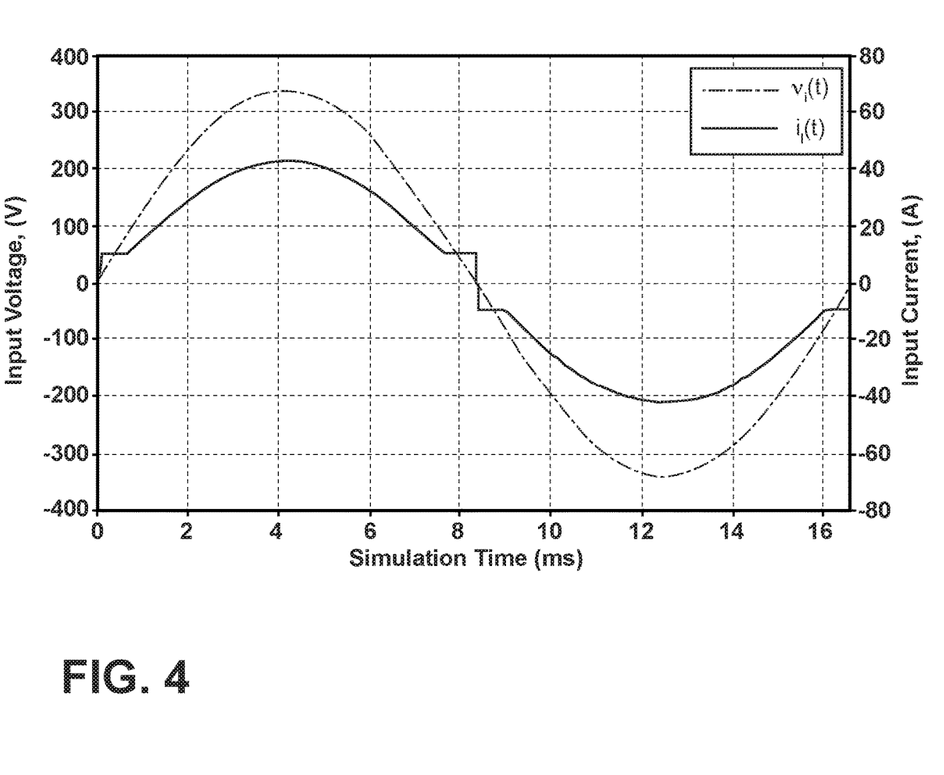
FIG. 4 depicts simulated AC grid voltage and current waveforms of the power converter of FIG. 1 in one embodiment using only a dual-phase-shift control mode.

The operative timing of the primary-side switches P1-P4 and the secondary-side switches S1-S4 in accordance with the PDPS mode of control is show in the illustrated embodiment of FIG. 3. To achieve a balanced current with near-zero switching points of $I_r$ when $|V_i(t)|>nV_o$, a different phase shift $t_v$ may be added on the primary-side voltage (making it three-level) while reducing the secondary-side voltage to a square wave, shown in FIG. 3. Once $t_r$ is identified, $t_w$ or $t_v$ and $f_s$ may be determined. Note that the control may switch between PDPS and SDPS frequently (possibly four times per fundamental AC input period) when the battery voltage is less than the peak AC voltage. Meanwhile, $f_s$ and the phase shifts may be tightly coupled and likely vary at all times. When the required power is low, $f_s$ may be quite high, which is conventionally not a possibility due to switching limitations. Since $f_s$ has an upper-limit, a lower-limit may be imposed on the power transfer, thereby distorting the grid current. In the illustrated embodiment of FIG. 4, the grid voltage is 208 VAC and the output (battery) voltage is 400V. When the grid voltage is close to zero, the switching frequency is clamped to a pre-set limit (500 kHz in the simulation results of FIG. 4), resulting in a bumpy/distorted input current. Such current distortion becomes worse at light load.

III. Triple-Phase-Shift Mode of Operation

The triple-phase-shift mode of operation in one embodiment corresponds to controlling the primary-side H-bridge 104 and the secondary-side H-bridge 108 to yield a three-level voltage signal on the primary of the transformer and a three-level voltage signal on the secondary of the transformer. This type of operation enhances light-load control capability and can yield near-unity power factor under light load conditions while maintaining ZVS down to zero power.

Figure 5:
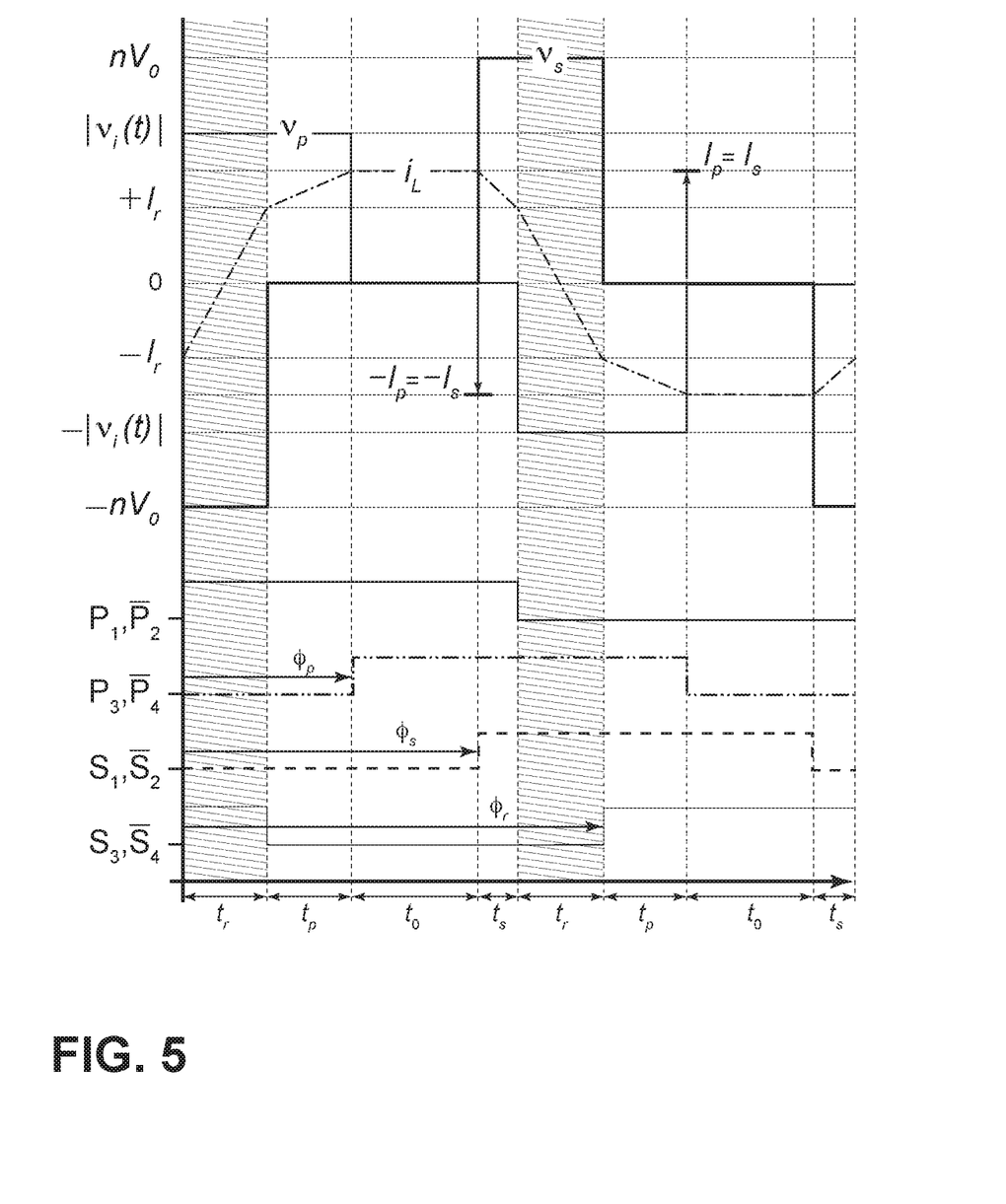
FIG. 5 shows a voltage, current, and switch timing diagram for operating the power converter of FIG. 1 according to one embodiment in a triple-phase-shift mode with non-overlapping transformer voltages.
Figure 6:
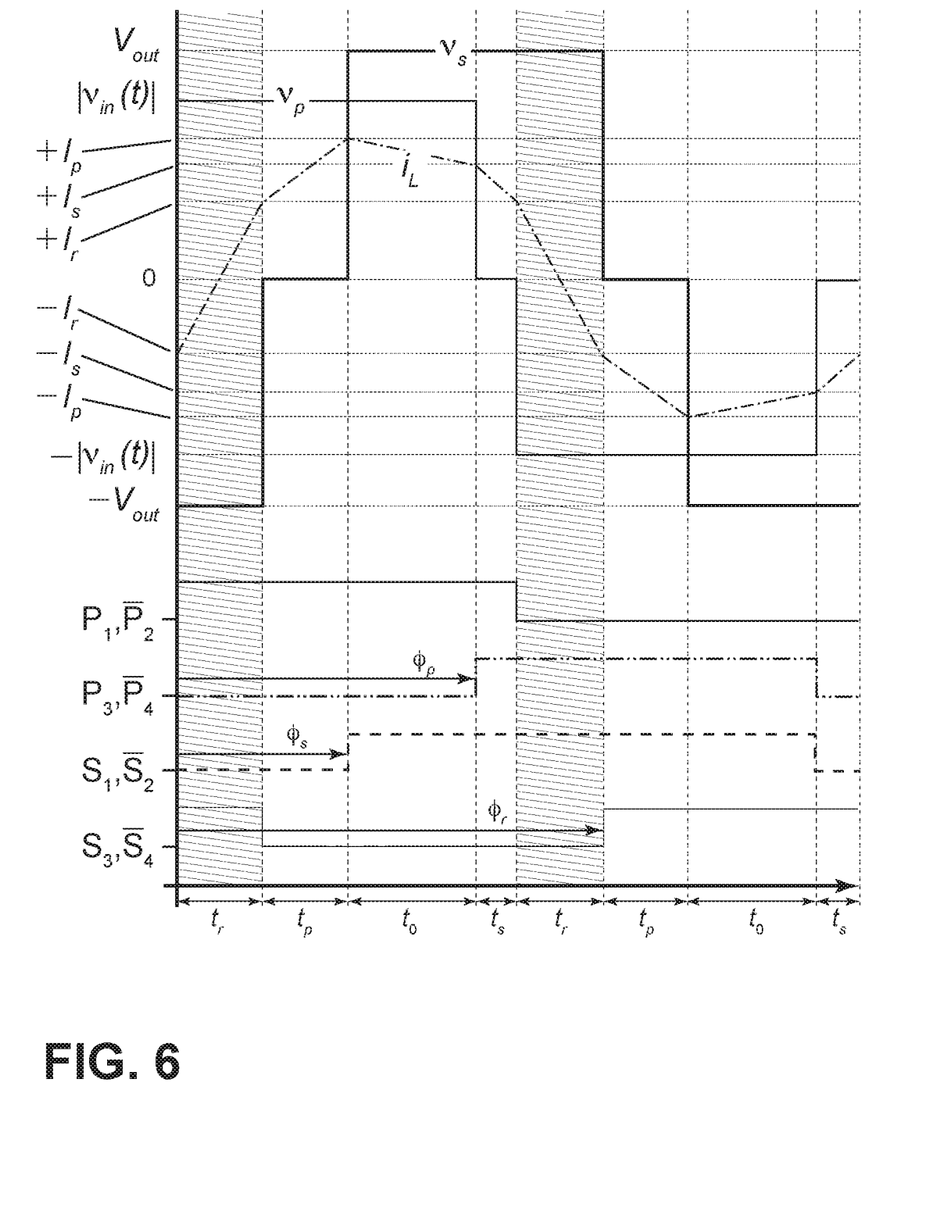
FIG. 6 shows a voltage, current, and switch timing diagram for operating the power converter of FIG. 1 according to one embodiment in a triple-phase-shift mode with overlapping transformer voltages.

The operative timing of the primary-side switches P1-P4 and the secondary-side switches S1-S4 according to two types of TPS control are shown in the illustrated embodiments of FIGS. 5 and 6. In TPS, the rising edge of $P_1$ and $S_3$ in FIG. 5 maintain a phase shift of $\phi_r$. Meanwhile, a second phase-shift, $\phi_p$, is placed between $P_1$ & $P_3$ and a third phase-shift, $\phi_s$, is placed between $P_1$ & $S_1$. This makes both, the primary and secondary voltages of the transformer 106, three-level waveforms. Both $\phi_s$ and $\phi_p$ work to regulate the near-zero switching current, $I_r$, which is responsible for maintaining ZVS during 4 of the 8 switching-on cycles within a period.

The transformer voltages and current are shown in FIG. 5. The power is regulated by $\phi_p$ and $\phi_s$. Note that, since the three phase shifts are independent of each other, it is possible that $\phi_p<\phi_s$ or $\phi_p>\phi_s$; the former case is denoted as the "non-overlap condition" as shown in FIG. 5 and the latter is denoted as the "overlap condition", shown in FIG. 6. The variables, $t_p$, $t_s$, $t_r$, $t_o$ and $t_{ov}$ are denoted as the primary-active, secondary-active, reactive, inactive, and overlap time intervals. T is the switching period. The value $I_r$ is the magnitude of the current during the reactive power transfer intervals when P1, S4, P2, or S3 turn on.

To realize ZVS turn-on during the switching of P1, P2, S3, and S4, the magnitude of $I_r$ is selected to be sufficient enough to completely discharge the drain-source capacitances of the upper and lower switching devices during dead-time. ZVS turn-on of the other four switching events (P3, P4, S1, and S2) may be substantially guaranteed since the transformer current will be larger than $I_r$. The value $I_p$ is the peak transformer current magnitude during the primary active-power-transfer interval when $v_p \neq 0$ & $v_s = 0$. Similarly, $I_s$ the peak current magnitude of the secondary active-power-transfer interval when $v_s \neq 0$ and $v_p = 0$. To substantially ensure that the value of $I_r$ remains constant at the P1, S4, P2, and S3 turn-on points (and that the $i_L$ waveform is balanced), the two active-time intervals are determined as proportional to the primary and secondary-side voltages. The power transfer of the DAB operating under TPS control in the non-overlap case can be described as:

$$p(t) = nV_o(I_r + I_s)t_s f_s,$$

which, after substituting and rearranging, yields the following:

$$p(t) = (2nV_o I_r f_s)t_s + \left(\frac{n^2 V_o^2 f_s}{L}\right)t_s^2.$$

This expression for power is a quadratic function of the secondary active-time interval, $t_s$. We could also rewrite this power expression in terms of $t_p$ and $|v_i|$.

While the output power depends on $I_r$, $f_s$, $t_p$, and $t_s$, the value of $I_r$ is independently controlled by only $t_r$, the voltage magnitudes, and leakage inductance, $L$. Thus, $I_r$ could be set to a constant desired value, determined by the switching device's output capacitance and maximum voltage while the power can be set by varying either $f_s$ and/or the time intervals. Here, the ZVS condition may be completely decoupled from the power delivery, unlike DPS control. Thus, from a control-standpoint, there is no significant need to vary $f_s$; this will vary the width of the to inactive region of the switching waveform. This mode of operation may resolve the PF distortion problem of VSF DPS control at light loads.

One main limitation of non-overlap TPS is the maximum power transfer can be quite low for practical system parameter and voltage values. Additionally, the efficiency of non-overlap TPS will be quite low, since a majority of the transformer current is circulating during the inactive period, $t_o$, possibly leading to excessive conduction losses. For larger power transfer under TPS, both time intervals $t_p$ and $t_s$ may be made larger, such that $\phi_p > \phi_s$. In this condition, both voltages are non-zero for three time intervals: the overlap, active, and reactive intervals with power transfer described as:

$$p(t) = nV_o f_s[(I_r + I_s)t_s + (I_p + I_s)t_{ov}],$$

which after substation and rearrangement yields:

$$p(t) = \frac{|v_i| f_s}{L} \left[ \begin{array}{c} -nV_o\left(\frac{1}{2}T - t_r\right)^2 \\ +2\left\{I_r L + \left(\frac{1}{2}T - t_r\right)(nV_o - |v_i|)\right\}(t_p + t_{ov}) \\ -(v_i^2 + nV_o|v_i| + n^2 V_o^2)/(nV_o)(t_p + t_{ov})^2 \end{array} \right].$$

This power expression is also a quadratic function of the total active time interval ($t_p + t_{ov}$ in this case). Also, note that the sign on the 2nd-order term is negative, indicating that there exists a maximum-power-point achievable with this control. If the switching frequency is lowered under TPS control, it is possible to increase the maximum power point, $P_{max}$, to any arbitrary value (within reasonable system limitations).

It therefore is possible to utilize a VSF TPS control to cover the entire power range. However, one downside with such a scheme is that the circulating current and peak switching currents can become quite large with lower frequencies. Lowering the frequency in the non-overlap region may increase the $t_o$ time interval in FIG. 5, which will not contribute any active power transfer and adds conduction loss. Furthermore, the highest peak current will occur at the boundary of non-overlap TPS and overlap TPS. Lowering the frequency may directly increase this value. Therefore, to reduce excessive conduction losses, a high TPS switching frequency may be maintained, which will consequently result in a low peak-power point.

IV. MPS Control—Dual and Triple Phase Shift Modes

As noted above, MPS control of the power converter is achieved with a combination of any two or more of the following modes of control: SPS, primary-side DPS, secondary-side DPS, and TPS. The following Table 1 depicts each mode of control and the corresponding waveforms for both the primary voltage and the secondary voltage. Of note, SPS may be used in conjunction with MPS control, but only under limited circumstances.

TABLE 1

Modes of Control of a Power Converter

| | Mode | Primary Voltage | Secondary Voltage |
|---|------|-----------------|-------------------|
| 1 | SPS | Two-level | Two-level |
| 2 | PDPS | Three-level | Two-level |
| 3 | SDPS | Two-level | Three-level |
| 4 | TPS | Three-level | Three-level |
| 5 | MPS | A combination of the above | |

Further by example, the controller 102 in one embodiment operates according to an MPS mode of operation that utilizes both the dual-phase-shift mode of operation and the triple-phase-shift mode of operation. The determination of whether to switch from the dual-phase-shift mode of operation or the triple-phase-shift mode of operation is based on the amount of power being consumed. The controller 102 is coupled to one or more sensors of the power converter 100 configured to sense one or more characteristics of power in the power converter 100. Based on the one or more sensed characteristics, the controller 102 may determine to operate according to the dual-phase-shift mode or the triple-phase-shift mode. In one embodiment, the controller 102 may determine to operate in the triple-phase-shift mode based on the one or more sensed characteristics indicating low power consumption, and to operate in the dual-phase-shift mode based on the one or more sensed characteristics indicating high power consumption. Examples of the change from the triple-phase-shift mode to the dual-phase-shift mode are depicted in the illustrated embodiments of FIGS. 7, 8, and 9.

The MPS control methodology resolves the complexity and PF distortion of the PDPS+SDPS control and the low efficiency of TPS control. The MPS control methodology in one embodiment may include operation according to high-frequency TPS control (primary and secondary as three-level) and VSF DPS control (primary or secondary as two-level and the other as three-level). The determination to switch or shift between TPS mode and the DPS mode may be based on one or more sensed characteristics and/or one or more operating parameters. For instance, at a given switching frequency, the controller 102 may calculate the expected output power under both control schemes (e.g., a power value). The transition point may occur when those power values are equal or very close to equal. The controller 102 may determine this equality and control the operation to change modes at or near the transition point, which is where the power levels are close to equal, resulting in substantially low or no distortion.

Figure 7:
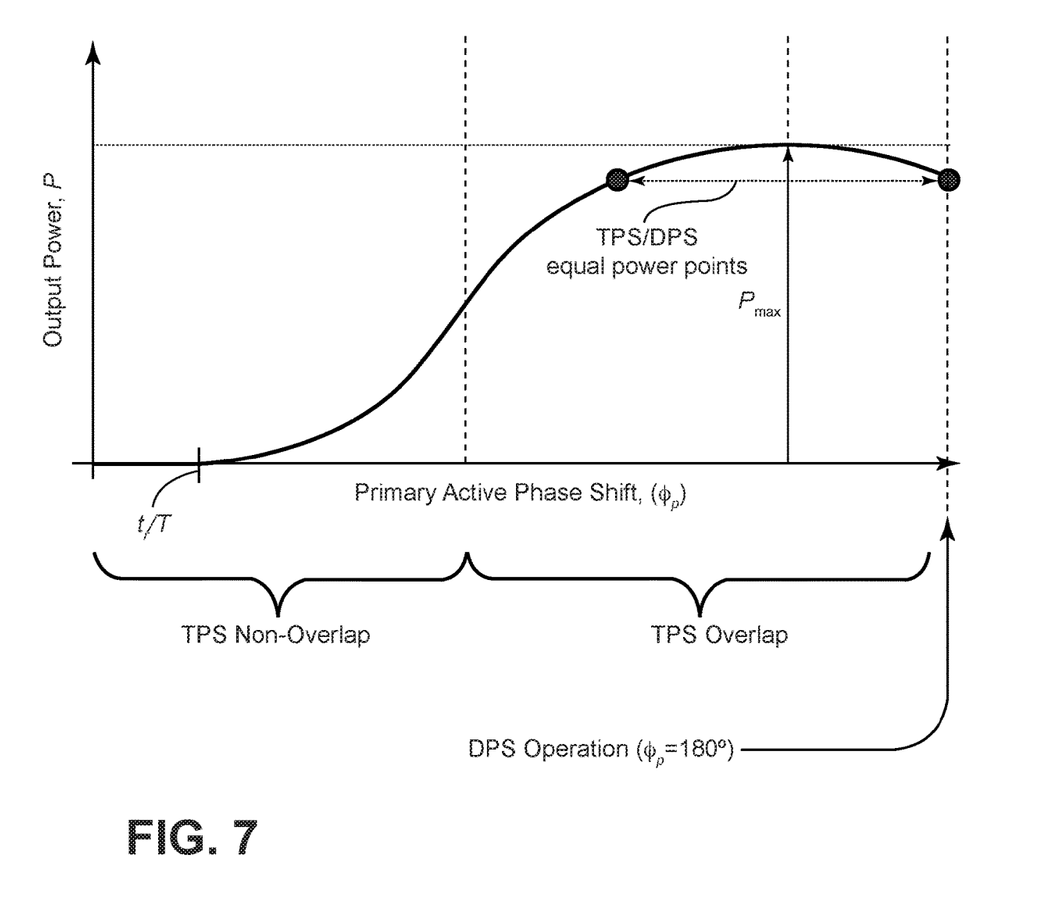
FIG. 7 depicts a region of operation of the power converter according to one embodiment over a full range of phase shifts for triple-phase-shift control at constant switching frequency.
Figure 8:
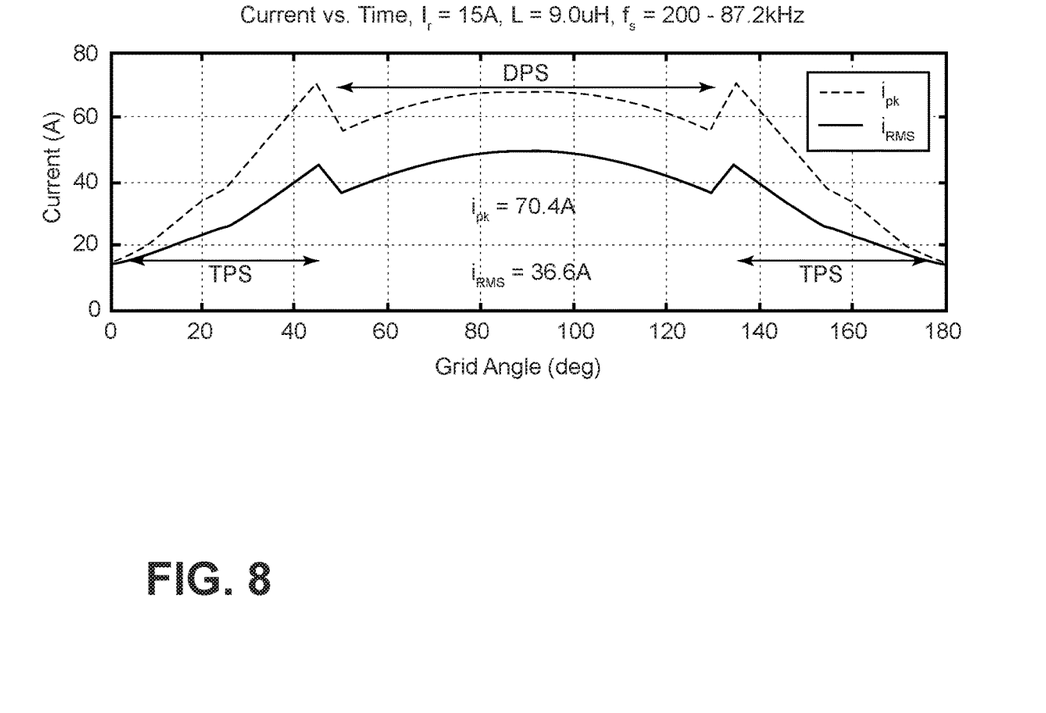
FIG. 8 depicts simulated operation of transformer current levels in the power converter according to one embodiment using the proposed multi-phase-shift control.

In the illustrated embodiment of FIG. 8 the difference in current stresses are shown: TPS has a higher current stress than DPS. Higher power may be achieved in TPS, but the efficiency is lower because the current is also higher. The TPS output power vs. one of the active phase shift values ($\phi_p$ or $\phi_s$) at constant switching frequency is shown in FIG. 7. As can be seen, there are two TPS quadratic waveforms, with the TPS power expressions plotted against the primary active phase shift, $\phi_p$, assuming that $|v_i|<nV_o$. The far right-hand side of FIG. 7 is a boundary condition where $\phi_p$ has reached 180 degrees. A similar condition may occur where $\phi_s$ reaches 180 degrees before $\phi_p$ (in the case of $|v_i|>nV_o$). The phase shift that substantially maximizes depends on the larger of the two transformer voltage magnitudes. If one of the two phase shifts reaches 180 degrees, the control will effectively reduce to DPS. Thus, DPS may be considered as a subset of TPS control in one embodiment.

In MPS, the TPS non-overlap and some of the TPS overlap control ranges may be used during low instantaneous power output intervals. When the instantaneous power demand is approximately equal to the TPS/DPS equal-power-point and is increasing, the controller 102 may phase-jump from the left-side power-point to the right-side power-point in FIG. 7. This phase jump is a transition from TPS to DPS. Higher powers may be achieved by maintaining DPS operation while lowering the switching frequency. When the power is decreasing, a reverse phase-jump from DPS back to TPS may be used.

This type of control may be visualized in the simulation waveform of FIG. 8. Transformer peak current and transformer RMS current of over half of a fundamental cycle of the grid are shown while operating at 7.2 kW output. From 0° to ~45° and from ~135° to 180°, the instantaneous power demand is low and so TPS may be used. For grid angles between 45° and 135°, the instantaneous power is higher than the TPS/DPS equal power point, and so the control may phase-jump to use DPS in this range. As can be seen, the transformer peak and RMS currents sharply reduce while under DPS control. Meanwhile, unity power factor can be achieved by using TPS in the light-load regions.

The MPS control according to one embodiment may yield the following: (1) with low instantaneous power, the DAB operates using TPS on the left-side of the power curve in FIG. 7; (2) when the instantaneous power exceeds the TPS/DPS equal-power-point, the controller 102 may jump to the right-side of the power curve in FIG. 7 and operate under VSF DPS; and (3) when the instantaneous power reduces, the controller 102 may jump back to TPS to control the power down to zero. This entire process may occur twice for every fundamental period of the AC grid input voltage.

As used herein, "two-level voltage waveform" or "two-level voltage signal" means an AC step voltage that alternates between a maximum value and a minimum value, with no intermediate step voltage therebetween, an example being shown in FIG. 2 ($v_s$). As also used herein, "three-level voltage waveform" or "three-level voltage signal" means a multi-level AC step voltage that comprises at least one intermediate step voltage at any point between a maximum value and a minimum value, an example being shown in FIG. 2 ($v_p$). Each step voltage is predominately constant for at least a minimum time period, also shown in FIG. 2.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A system comprising:
a dual-active-bridge (DAB) converter having a transformer, a first H-bridge coupled to a primary winding of the transformer and controlled by first control signals, and a second H-bridge coupled to a secondary winding of the transformer and controlled by second control signals;
a controller to provide the first control signals to the first H-bridge for a two-level voltage waveform or a three-level voltage waveform in the primary winding, the controller being further adapted to provide the second control signals to the second H-bridge for a two-level voltage waveform or a three-level voltage waveform in the secondary winding; and
a load coupled to the second H-bridge of the DAB converter and having a power consumption, wherein, in a dual-phase-shift (DPS) mode of operation, the controller causes a two-level voltage waveform in at least one of the primary winding and the secondary winding, and wherein, in a triple-phase-shift (TPS) mode of operation, the controller causes a three-level voltage waveform in each of the primary winding and the secondary winding,
wherein the controller is operable to cause a transition from the TPS mode of operation to the DPS mode of operation in response to an expected power output of the DAB converter in the TPS mode of operation being equal to an expected power output of the DAB converter in the DPS mode of operation in combination with a detected increase in the power consumption of the load.

2. The system of claim 1 wherein the load includes a rechargeable vehicle battery.

3. The system of claim 1 wherein the controller is adapted to calculate the expected power output of the DAB converter for determining when to transition from the DPS mode of operation to the TPS mode of operation.

4. The system of claim 3 wherein the controller is operable to transition from the DPS mode of operation to the TPS mode of operation when the expected power output of the DAB converter is substantially equal for both modes of operation and the power consumption of the load is decreasing.

5. The system of claim 1 wherein the controller is operable to increase the power output of the DAB converter by lowering a switching frequency of the DAB converter during the DPS mode of operation.

6. The system of claim 1 wherein the DAB converter is coupled to a rectified AC grid voltage.

7. The system of claim 1 further including an inverter adapted to convert an AC grid voltage into a DC voltage for the DAB converter.

8. A method for controlling a dual-active-bridge (DAB) converter having a transformer, a first H-bridge coupled to a primary winding of the transformer, and a second H-bridge coupled to a secondary winding of the transformer, the method comprising:
providing first control signals to the first H-bridge to selectively cause a two-level voltage waveform or a three-level voltage waveform in the primary winding of the transformer;
providing second control signals to the second H-bridge to selectively cause a two-level voltage waveform or a three-level voltage waveform in the secondary winding of the transformer;
wherein, in a dual-phase-shift (DPS) mode of operation, a controller causes a two-level voltage waveform in the primary winding or the secondary winding, wherein, in a triple-phase-shift (TPS) mode of operation, the controller causes a three-level voltage waveform in the primary winding and in the secondary winding, and wherein, at a TPS/DPS equal-power-point, the controller determines that a power output in the TPS mode of operation is equal to a power output in the DPS mode of operation;
in response to a load coupled to the second H-bridge having a high power consumption that is increasing and equal to the TPS/DPS equal-power-point, generating a two-level voltage in at least one of the primary winding and the secondary winding; and
in response to the load transitioning to a low power consumption that is decreasing and equal to the TPS/DPS equal-power-point, generating a three-level voltage waveform in the primary winding and the secondary winding.

9. The method of claim 8 wherein the load includes a rechargeable vehicle battery.

10. The method of claim 8 wherein transitioning from a high power consumption to a low power consumption is determined relative to a predetermined threshold value.

11. The method of claim 8 wherein the primary winding includes a two-level voltage waveform and the secondary winding includes a three-level voltage waveform during high power consumption.

12. The method of claim 8 wherein the primary winding includes a three-level voltage waveform and the secondary winding includes a two-level voltage waveform during high power consumption.

13. The method of claim 8 wherein the primary winding includes a two-level voltage waveform and the secondary winding includes a two-level voltage waveform during high power consumption.

14. The method of claim 8 further including generating a two-level voltage waveform in the primary winding in response to the load returning to the high power consumption.

15. The method of claim 8 further including generating a two-level voltage waveform in the secondary winding in response to the load returning to the high power consumption.

16. The method of claim 8 further including generating a two-level voltage waveform in the first and secondary windings in response to the load returning to the high power consumption.

17. A system comprising:
a dual-active-bridge (DAB) converter having an input H-bridge controlled by first control signals and an output H-bridge controlled by second control signals, wherein an output of the input H-bridge is coupled to an input of the output H-bridge through at least one inductor;
a controller to provide the first control signals to the input H-bridge for causing a two-level voltage waveform or a three-level voltage waveform at the output of the input H-bridge, the controller being further adapted to provide the second control signals to the output H-bridge for causing a two-level voltage waveform or a three-level voltage waveform at the input of the output H-bridge; and
a load coupled to the output H-bridge of the DAB converter and having a power consumption, wherein, in a dual-phase-shift (DPS) mode of operation, the controller causes a two-level voltage waveform in at least one of the output of the input H-bridge and the input of the output H-bridge, and wherein, in a triple-phase-shift (TPS) mode of operation, the controller causes a three-level voltage waveform in each of the output of the input H-bridge and the input of the output H-bridge,
wherein the controller is operable to cause a transition from the TPS mode of operation to the DPS mode of operation in response to an expected power output of the DAB converter in the TPS mode of operation being equal to an expected power output of the DAB converter in the DPS mode of operation in combination with a detected increase in the power consumption of the load.

* * * * *